E. N. GRIFFITH.
Spading-Fork.
No. 222,695. Patented Dec. 16, 1879.
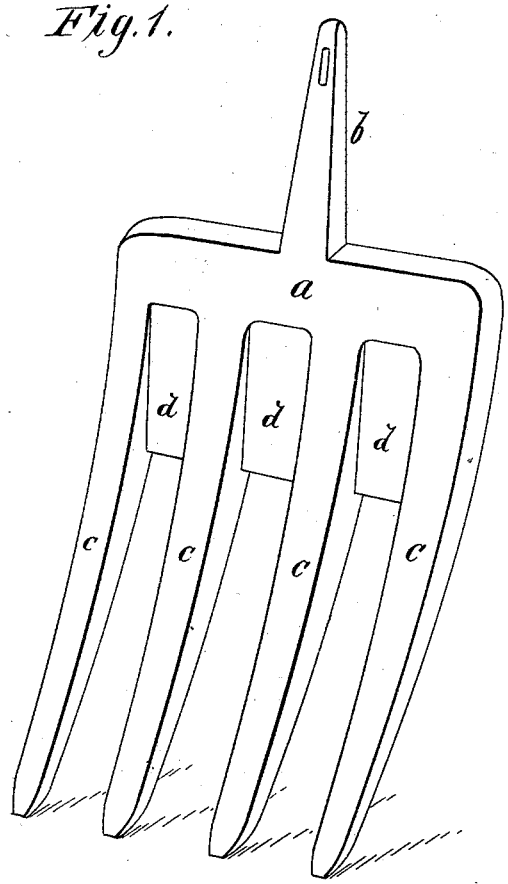
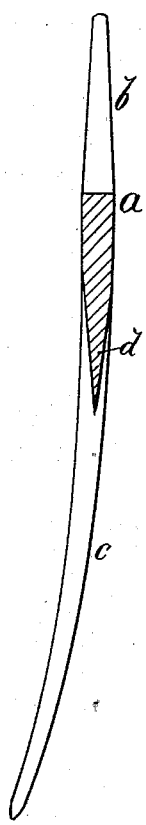

UNITED STATES PATENT OFFICE.

EDWARD N. GRIFFITH, OF IRVINGTON, NEW JERSEY.

IMPROVEMENT IN SPADING-FORKS.

Specification forming part of Letters Patent No. 222,695, dated December 16, 1879; application filed October 8, 1879.

*To all whom it may concern:*

Be it known that I, EDWARD NORTON GRIFFITH, of Irvington, in the county of Essex and State of New Jersey, have invented a new and Improved Spading-Fork, of which the following is a specification.

Spading-forks as heretofore made are adapted for use only in clean and mellow soil. On sod or soil containing roots a spade is required to cut the grass and roots, as they would get between the tines of the fork and clog.

The object of my invention is to furnish a spading-fork adapted for use in any soil; and the invention consists in a spading-fork having tines as usual, and formed between the tines at the head with knife-edges, whereby the fork may be used to cut grass, sod, or roots, or to take the place of a spade in addition to its ordinary use as a fork.

In the accompanying drawings, forming part of this specification, Figure 1 is a perspective view of my improved fork. Fig. 2 is a section of the same.

Similar letters of reference indicate corresponding parts.

The fork is formed with the head $a$, tang $b$, and flat tines $c$, as usual. The under side of the head $a$ between the tines, instead of being made flat, as usual, is extended downward in a beveled form between each tine to form the knife-edges or cutters $d$, the bevel being upon both sides, or one side only, as desired.

It will be seen that by this construction the fork may be used to cut a sod the full width of the fork, the tines being first entered, and the fork then pressed down until the cutters $d$ act. The cutters $d$ will also cut any grass or roots that may get between the tines, so that the fork may be used on other than clean and mellow soil.

The fork is to be made of steel, and the cutters can be kept sharp, as required. The addition of the cutters to the fork will not add materially to the expense, while it gives to the fork a more extended use, the improved spading-fork combining two gardening-tools in the one implement.

The fork has a further advantage when used for turning manure or rubbish of any kind under the soil, which is apt to be pierced by the tines and jammed in bunches between the tines of an ordinary fork, in which case the cutters of my improved fork will cut the bunches and free them.

I am aware that it is not new to have the spaces between hoe-teeth with angular terminations, the latter and the sides being made with sharp edges; but

What I claim as new and of my invention is—

1. A spading-fork fitted with cutters or knife-edges between the tines at the head, substantially as and for the purposes set forth.

2. A spading-fork having the head extended between the tines and beveled to form knife-edges, substantially as and for the purposes set forth.

EDWARD NORTON GRIFFITH.

Witnesses:
 EDWARD MORRELL GRIFFITH,
 MARIETTA KITCHELL GRIFFITH.